Sept. 15, 1953   J. L. MOODY ET AL   2,652,527
OVERLOAD RELIEF FOR ELECTRIC MOTORS
Filed Jan. 13, 1950   4 Sheets-Sheet 3
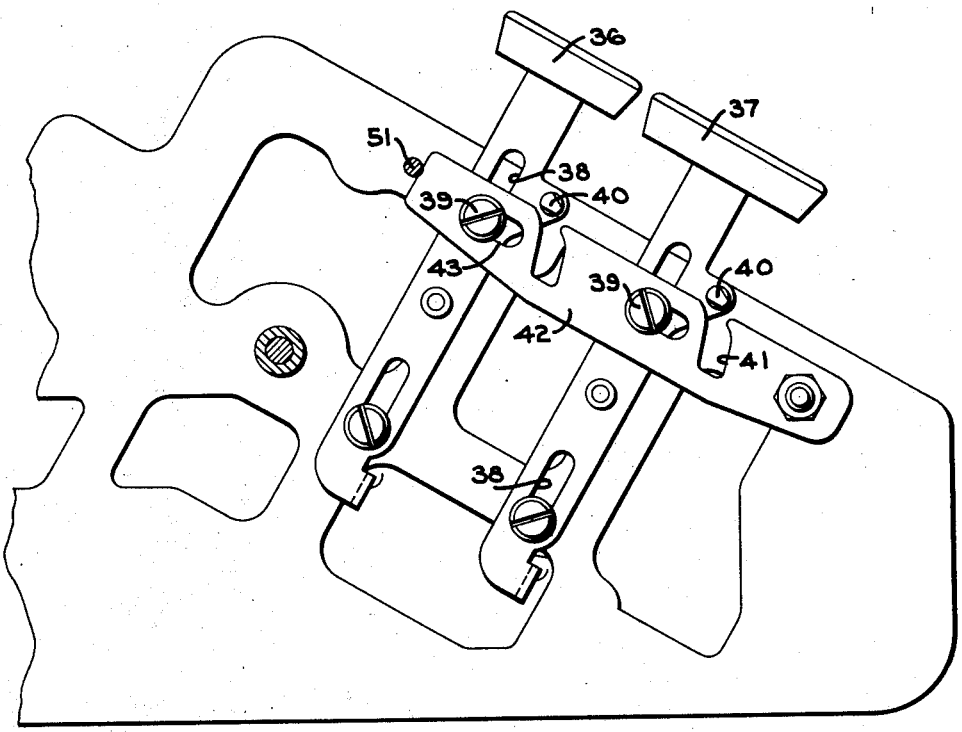
FIG_3
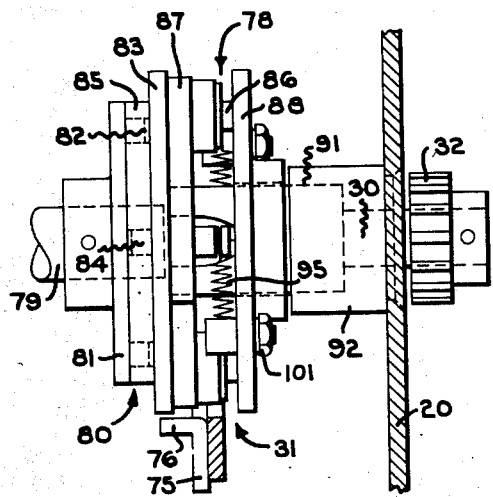
FIG_6
INVENTORS.
JOHN L. MOODY
ELWOOD A. DAVIS
BY Sept. 15, 1953        J. L. MOODY ET AL        2,652,527
OVERLOAD RELIEF FOR ELECTRIC MOTORS
Filed Jan. 13, 1950                          4 Sheets-Sheet 4
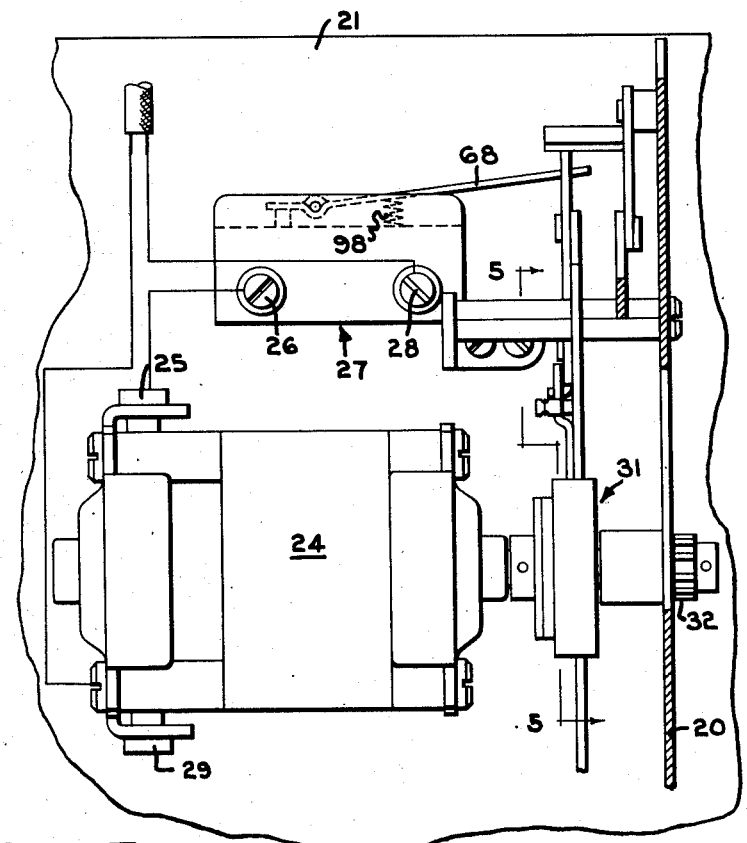
FIG_4
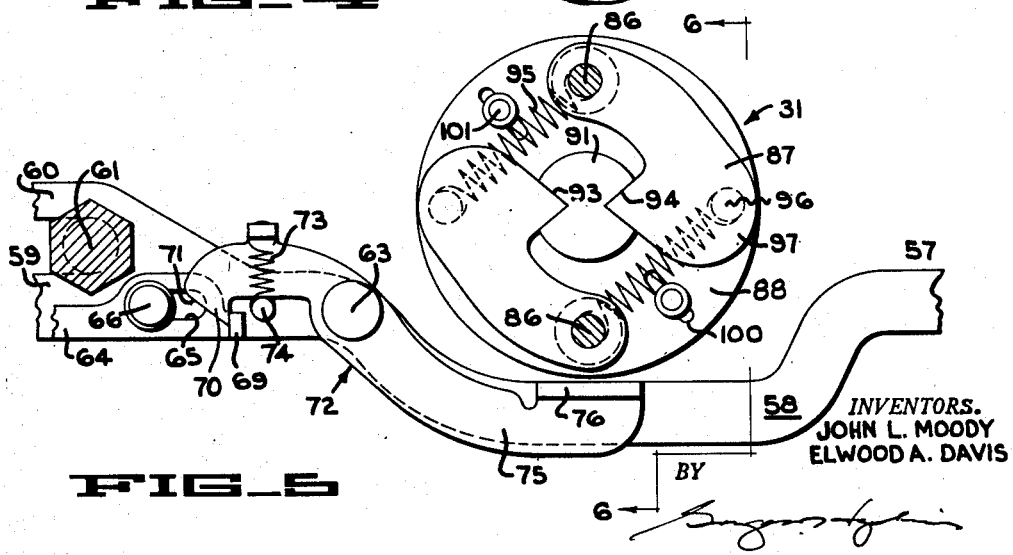
FIG_5
INVENTORS.
JOHN L. MOODY
ELWOOD A. DAVIS
BY Patented Sept. 15, 1953

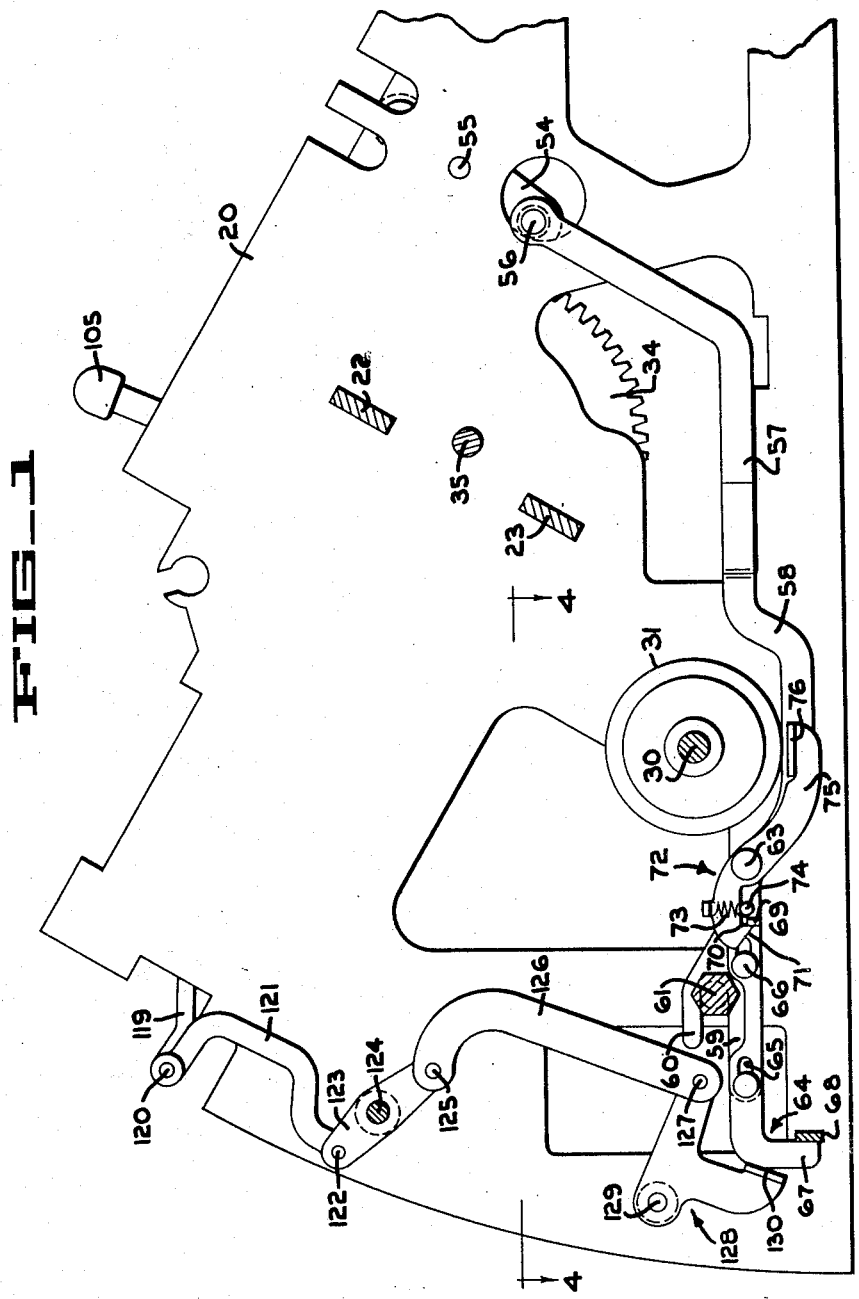
Sept. 15, 1953  J. L. MOODY ET AL  2,652,527
OVERLOAD RELIEF FOR ELECTRIC MOTORS
Filed Jan. 13, 1950  4 Sheets-Sheet 1
INVENTORS.
JOHN L. MOODY
BY ELWOOD A. DAVIS

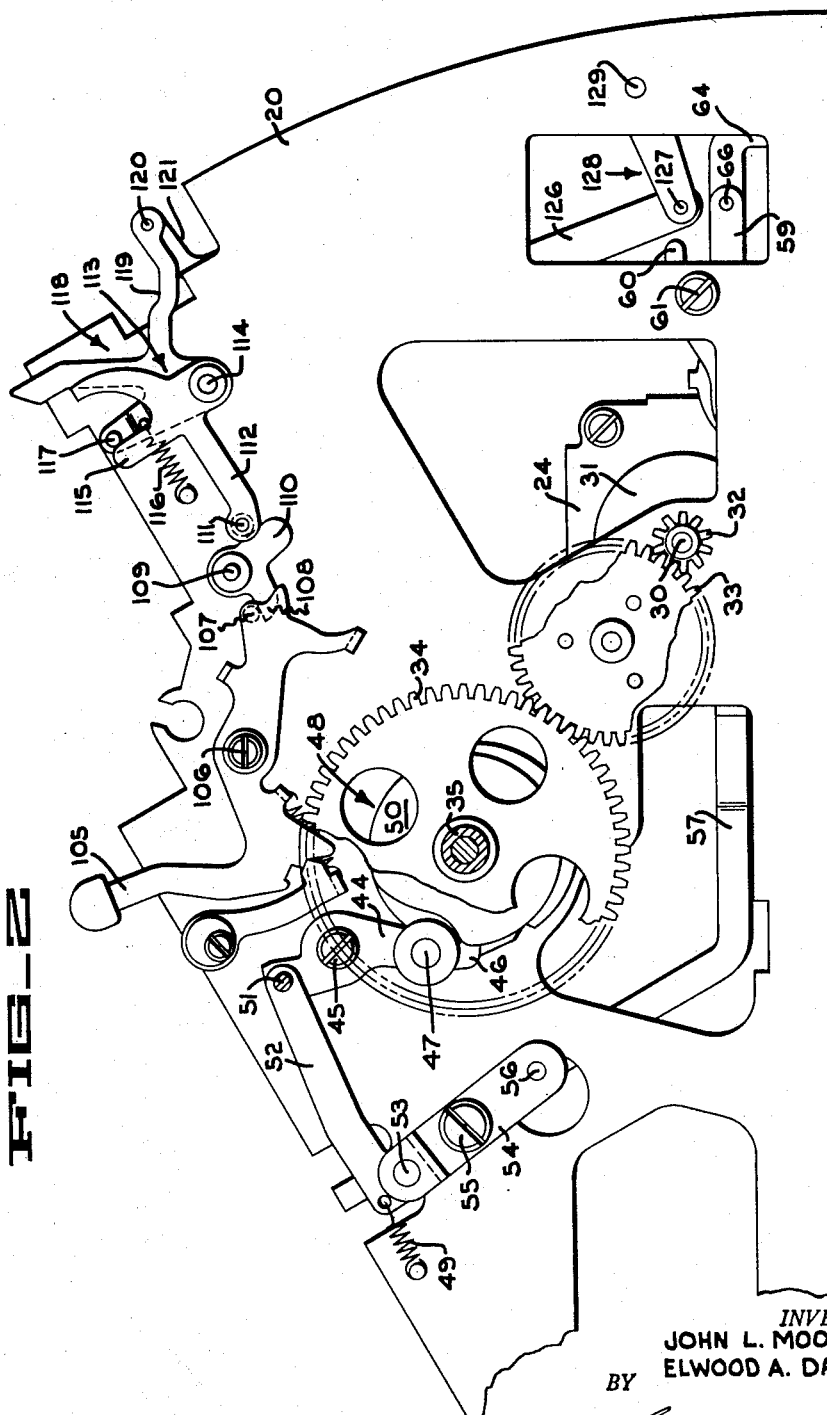

2,652,527

UNITED STATES PATENT OFFICE 2,652,527

OVERLOAD RELIEF FOR ELECTRIC MOTORS

John L. Moody, Oakland, and Elwood A. Davis, Hayward, Calif., assignors to Friden Calculating Machine Co., Inc., a corporation of California Application January 13, 1950, Serial No. 138,328

9 Claims. (Cl. 318—475)

This invention relates to an improved overload means for power driven business machines and the like, and more particularly to an arrangement for automatically stopping the operation thereof by disconnecting the driving motor from the power supply system whenever overload conditions occur as a result of improper operation of the machine.

In the design and construction of automatic business machines, such as automatic calculators and the like, it has frequently been the practice to provide some form of overload relief means between the driving motor and the power input shaft of the machine so as to avoid possible damage either to the machine or to the motor in the event the resistance to rotation becomes excessive. One arrangement which has sometimes been used for this purpose utilizes a slip clutch which limits the torque transmitted from the motor to the input shaft of the machine to a predetermined maximum value, and provides an audible warning to the operator whenever this predetermined maximum value is exceeded, but without disconnecting the motor from the power supply. Such a warning device is often objectionable and disturbing to other workers, particularly if the business machine is used in a relatively congested area, since this audible warning normally persists until such time as the driving motor of the machine is stopped by manually disconnecting the power supply cord from the machine.

It is an important object of the present invention, therefore, to provide a fully automatic and relatively quiet overload responsive means for a business machine or the like which is operable to open the power circuit for the driving motor whenever the torque transmitted by the motor exceeds a predetermined maximum.

It is another object of the invention to provide a readily adjustable and fully automatic slip clutch mechanism for a business machine, or the like, which is responsive to predetermined overload values for interrupting the driving motor power circuit in a business machine, or the like, and without requiring attention on the part of the operator.

It is also an object of this invention to produce an overload responsive device adapted to automatically open the driving motor supply circuit of a business machine, or the like, in the event the machine for any reason becomes inoperative or the resistance to rotation becomes excessively high, which device is capable of being manually reset so as to restore the motor to normal functional control after the disabling or overload condition has been eliminated.

It is still another object of the invention to provide an overload responsive mechanism operable to automatically stop the operation of the driving motor in a business machine, or the like, without attention on the part of the operator and in such a manner as to protect both the machine and the motor from possible damage during predetermined overload conditions substantially impeding or preventing normal operation of the machine, which mechanism includes manually operable means for conditioning the motor control circuit for normal operation as soon as the overload condition has been eliminated.

It is also an object of the invention to produce an overload responsive mechanism for automatically disconnecting the driving motor power circuit in a business machine, or the like, in the event of jamming or malfunctioning of the machine, which mechanism includes means for adjustably changing the critical value of torque for which the overload responsive mechanism is set, and is also provided with manually operable means for restoring the motor power circuit to normal functional control after the overload condition has been removed.

These, and other, objects of the present invention will be apparent from consideration of the specification and claims hereof, and by a consideration of the drawings, in which:

Fig. 1 is a left-hand view of the right control plate showing the overload responsive device and the resetting means therefor.

Fig. 2 is a right-hand view of the right control plate showing the mechanism illustrated in Fig. 1.

Fig. 3 is a fragmentary elevational view to an enlarged scale showing a typical control key arrangement for a business machine.

Fig. 4 is a plan view of the motor control circuit and its associated overload responsive mechanism taken along the lines 4—4 in Fig. 1.

Fig. 5 is an elevational view of the slip clutch mechanism taken along the lines 5—5 in Fig. 4 and looking in the direction of the arrows.

Fig. 6 is a front elevational view of the slip clutch taken along the lines 6—6 in Fig. 5.

Referring now more particularly to the drawings, in which like reference numerals indicate like parts in the several views, there is shown generally at 20 a right-hand control plate of a business machine, such as an automatic calculator, which plate is suitably secured to the base 21 of the machine and to the crossframe members 22, 23 (Fig. 1) which transversely extend across the bed of the machine. An electric motor 24, preferably of the series-wound or other suitable type, has one brush terminal 25 (Fig. 4) connected with a terminal 26 on a normally-open, single-pole, single-throw, micro-switch 27 having its other terminal 28 connected to one lead of a dual conductor power supply cord, the other lead thereof being connected directly to the motor brush terminal 29. Motor 24 has a rotating armature which drives an output shaft 30 through a slip clutch 31, the shaft 30 being extended through a suitable aperture in the plate 20 to carry a pinion gear 32 secured to the outer end thereof. This gear 32 is adapted to drive a larger diameter gear 33 which rotates the clutch drive gear 34 and main drive shaft 35, which shaft is adapted to be driven through a main clutch 48 in the same direction as the motor armature, but at a predetermined lower speed determined by the gear diameters.

Referring now to Fig. 3, there is shown a pair of control keys 36, 37, such as the minus and plus keys of an adding or calculating machine, each such key being slidably supported for predetermined vertical movement by a pair of substantially vertically disposed and aligned elongated slots 38 which coact with a pair of corresponding screws 39 carried by the supporting structure. Each such control key is continuously urged to its uppermost position by a suitable tension spring, not shown, and adjacent the uppermost slot 38 on each key there is provided a stud 40 adapted to coact with an angularly disposed camming slot 41 formed in a longitudinally movable control slide 42 supported for endwise sliding movement on the top pair of screws 39 by the longitudinally disposed slots 43. A main clutch control lever 44 pivoted as at 45 (Fig. 2) actuates a conventional ratchet mechanism which is operable to establish a clutching engagement between the gear 34 and the main drive shaft 35. A disk cam 50 on main clutch 48 coacts with a roller 47 carried by the downwardly extending arm 46 to move the lever 44 clockwise as viewed in Fig. 2 so as to maintain the clutch 48 in engagement. When the machine reaches the full-cycle position illustrated in Fig. 2, however, roller 47 falls into an irregularity in the surface of clutch cam 50, under the urgency of spring 49, so as to move the main clutch 48 to its disengaged position. Since the stud 51 carried by the upper arm of clutch lever 44 projects outwardly across the rear edge of the control slide 42 (Fig. 3), the rearward movement imparted to slide 42 by a depression of either of the control keys 36, 37 rocks the control lever 44 (clockwise in Fig. 2) so as to move the clutch mechanism out of its normally disengaged full-cycle position. Stud 51 is also connected to one end of a link 52 having its other end connected by a pin 53 with one end of a lever 54 pivoted as at 55 on the control plate 20. The other end of lever 54 is pivotally connected at the point 56 with one end of a downwardly and rearwardly extending switch control link 57.

As shown in Figs. 1 and 5, the link 57 is provided with a substantially U-shaped portion 58 adapted to pass below and in predetermined close proximity to the slip clutch 31, but without direct contact therewith. The control link 57 is also provided with a horizontally disposed rear end portion 59 which is supported for endwise sliding movement by the rearwardly extending prong 60, the inner surface of which slides longitudinally across the upper surface of a bolt, or pin, 61 suitably secured to the control plate 20. This rearward end 59 of link 57 also carries a longitudinally extensible live finger, or switch actuating member, 64 supported for predetermined endwise sliding movement at the rearward end of link 57 by the pin and slot connections provided by the oblong slots 65 and the supporting pins 66. This slidably supported live finger, or tip, 64 is provided with a downwardly depending right-angle extension 67 adapted to coact with the actuator arm 68 of micro-switch 27. The slidable switch actuating finger, or tip, 64 is provided at its forward end with a lug, or ear, 69 adapted to coact with a latching tooth 70 having a beveled outer surface 71, which tooth 70 is formed on one end of a latching lever 72 pivoted as at 63 on the link 57 in a position between slip clutch 31 and bolt 61. The downwardly depending tooth 70 of the lever 72 is urged into latching engagement with the lug 69 by the downward resilient action of a spring 73 operably connected to lever 72 and anchored at its lower end to a pin 74 carried by the link 57. The forwardly extending arm 75 of latching lever 72 is provided with a relatively large ear or right-angle extension 76 which is horizontally disposed directly below the slip clutch 31 and in predetermined close proximity with the lower surface thereof.

As shown in Fig. 6, there preferably is provided between armature shaft 79 and slip clutch 31 a self-aligning coupling 80 consisting of an inner disk 81 driven by the armature shaft 79 and an outer driven disk 83 separated from the driving disk 81 by a disk-shaped layer of leather 85 or other suitable flexible material. Disk 81 has a pair of pins 82 projecting outwardly therefrom into coacting holes formed in the resilient disk 85, whereas the driven disk 83 establishes a torque transmitting engagement with the disk 85 through the pins 84. Armature shaft 79 extends through a centrally disposed hole in the disks 81 and 85 and has its outer end rotatably seated against the driven disk 83. Secured to the driven disk 83 by the pins 86 is an outer clutch assembly 78 which rotates with the disk 83 and includes a pair of oppositely disposed clutch pawls 87 and an outer clutch plate 88. Extending through a centrally disposed aperture in plate 88 is a short cylindrical spindle 91 whose inner end abuts against the outer surface of disk 83, which spindle is freely rotatable in a suitable journal 92 secured to control plate 20. Preferably, the output shaft 30, upon which the drive pinion 32 is rigidly secured, is formed integral with spindle 91. Spindle 91 also has a pair of axially disposed and diametrically opposed V-grooves 93 formed therein, which grooves are adapted to coact with the similarly formed and substantially V-shaped latching projections 94 provided on the free end of each clutch pawl 87. A pair of tension springs 95 each having one end secured to a pawl supporting pin 86 and its other end affixed to a pin 96 carried by the free end of the oppositely disposed pawl 87, resiliently urge the projections 94 on the pawls into one of the similarly shaped V-grooves 93 provided on the coacting surface of the short spindle 91. Thus, whenever torque in excess of a predetermined maximum value is transmitted by the motor armature 79 to the slip clutch 31 through the self-aligning coupling 80, each pawl 87 on the slip clutch is forced outwardly by the camming action of the projections 94 as they are positively moved out of engagement with the V-grooves 93 on spindle 91 so that the contoured outer surface 97 of each pawl 87 moves outwardly beyond the periphery of the disk 83, in opposition to the resilient action of spring 95, whereupon the pawls 87 move the latching lever 72 clockwise as viewed in Fig. 5. In this manner, latch tooth 70 is released from engagement with lug 69 so that the extensible tip or live link 64 is moved rearwardly to a second adjusted position determined by the pin and slot connection between the members 57 and 64, which outward movement is imparted to the extensible link 64 by the outward resilient action of the micro-switch actuator arm 68, the latter being continuously urged towards the open-circuit position (counterclockwise in Fig. 4) by a compression spring 98 contained within the micro-switch 27.

Means is provided for adjusting and changing the critical torque value for which the slip clutch 31 is set, and to equalize the torque settings of the two clutch pawls 87 with each other. For this purpose there is provided in the plate 88 a pair of radially disposed and diametrically opposed slots 100, each of which carries a pin 101 (Figs. 5 and 6) which may be adjustably moved into and retained in a predetermined pressing contact with the adjacent tension spring 95, thereby varying the amount of torque which will be required to move the pawl projections 94 out of the coacting V-grooves 93 on spindle 91 so as to release the associated motor switch control mechanism. Moreover, the pins 101 can be adjustably positioned within the slots 100 so that substantially the same amount of torque will be required to simultaneously release both of the clutch pawls 87.

Mechanism is also provided for manually restoring the extensible link or live tip 64 to its normal fixed position with respect to control link 57, illustrated in Fig. 1, wherein the forward ear 69 on link 64 coacts with the beveled edge 71 on the latching lever 72 to re-establish a latching engagement between ear 69 and the downwardly depending tooth 70 on the lever. During this forward movement of the slidably supported live tip or switch actuator 64 the downwardly depending arm 67 thereon restores the micro-switch 27 to its initial position by depressing the actuator 68 in opposition to the resilient action of spring 98. The control linkage provided for resetting and relatching the slidable tip 64 may be utilized to perform other control functions in the machine, if desired, such as suspending or terminating the operation of an automatic calculating machine during automatic division operations, and includes a manually operable slip clutch restore key 105 (see Fig. 2) pivoted as at 106 on plate 20 and provided at its rear end with a stud 107 adapted to coact with one arm 108 of a bellcrank 110 rotatably supported on a pin 109. The rearwardly extending arm of bellcrank 110 coacts with a stud 111 carried by one arm 112 of a bellcrank 113 pivoted as at 114 on the right-hand control plate. Bellcrank 113 has an upwardly extending arm 115 which engages a pin 117 carried by a second bellcrank 118 pivotally supported by the pin 114. Bellcrank 118, and consequently bellcrank 113, is urged in a counterclockwise direction by a suitable tension spring 116. Bellcrank 118 has a rearwardly extending arm 119 pivotally connected at the point 120 to the upper end of a link 121 (see Fig. 1) pivotally connected by the pin 122 to one arm of a lever 123 rotatable about the axis of a shaft 124 which projects outwardly beyond the control plate 20. The other end of lever 123 is pivotally connected at the point 125 to the upper end of a link 126 having its lower end connected by a pin 127 to one arm of a bellcrank 128 which is free to turn about the axis of a transverse shaft 129. The downwardly depending arm of bellcrank 128 is provided with a flanged ear or lug 130 which is adapted to coact with the downwardly depending right angle extension 67 on the extensible link or live pawl 64 so as to depress the micro-switch actuator 68 and return the switch actuating finger 64 to the normally retracted position illustrated in Fig. 1.

It will be readily apparent from the foregoing that there has been provided a slip clutch arrangement which can be readily adjusted for varying degrees of overload so as to prevent either the driving motor or the business machine driven thereby from being damaged in the event of jamming or improper functioning of the machine. There has also been provided an overload responsive motor switch control mechanism which is operable to supersede or override the normal functional controls and automatically open the motor power supply circuit whenever the torquqe delivered by the motor output shaft exceeds a predetermined maximum, which mechanism is relatively quiet in its operation and is readily re-engaged for normal functional control as soon as the abnormal condition responsible for the overload has been eliminated. Moreover, an overload responsive mechanism has been provided for automatically disconnecting the driving motor supply without requiring action on the part of the operator or creating an audible warning which may be disturbing to other personnel working in a relatively congested area.

We claim:

1. An overload relief device for a motor which comprises the combination of a clutch disk driven by the said motor, a plurality of pawls carried by the said disk, resilient means biasing said pawls to a retracted position, means for adjustably changing the resilient pressure tending to urge the said pawls to their normally retracted position, a driven shaft having a plurality of longitudinally disposed V-grooves thereon adapted to form a predetermined torque transmitting engagement with the said pawls, each of the said pawls being adapted to be moved outwardly beyond the periphery of the said disk to an active position whenever the resistance to rotation of the said driven shaft exceeds a predetermined overload value, a normally open power supply control switch for the said motor, a switch control member, and a latch operable to releasably retain the said switch control member in the closed circuit position, the said latch being released by the movement of the said pawls from their normally retracted to their outwardly extending active position so as to open the said switch and automatically stop the said motor.

2. In a business machine driven by an electric motor and having a normally open power supply switch for controlling operation of the motor, the combination which comprises a power input shaft for the said machine, a slip clutch between the said motor and the said input shaft having a plurality of normally retracted cams thereon adapted to be positively expanded in response to a predetermined overload condition, means for adjustably setting the said slip clutch for varying conditions of overload, linkage means including a retractable live link member for operating the said switch, means for normally latching the said live link member in a first adjusted position relative to the said linkage means, the said cams being operable in their expanded condition for releasing the said link member for movement to a second adjusted position in such a manner as to allow the said switch to move to the open circuit position, and manually operable means for resetting the said link member in its first adjusted position after the said overload condition has been eliminated.

3. An overload relief device for an electric motor comprising the combination of a driving member connected to said motor, a driven member associated with said driving member, notches in one of said members, a spring-urged pawl mounted on the other of said members normally engaging the notches of the said one member, a normally open switch controlling the flow of power to said motor, a control mechanism including a live tip adapted to be releasably latched in an operative position so as to close the said normally open switch, means controlled by the displacement of said pawl from said notch for releasing the said live tip for movement to a second position so as to cause the said switch to move to its normally open position, and manually operable means for returning the said live tip to its first position.

4. In a device of the character described, a motor, a driving member connected to said motor, a driven member associated with said driving member, a notch in one of said members, a pawl mounted on the other of said members adapted to engage the notch of the said one member, an adjustable resilient means urging said pawl into said notch, a normally open switch controlling the flow of power to said motor, a manually operated means including a switch control link and means for holding said link in operative position for a predetermined cycle of operation, a live tip on said link engaging said switch, a latch for holding said live tip in switch closing position, means controlled by the displacement of said pawl from said notch for releasing said latch, and a second manually operated means for relatching said live tip in switch closing position.

5. An overload relief device for a motor driven business machine including a control key and a motor switch, comprising a driving member connected to said motor, a driven member associated with said driving member, notches in said driven member, spring-urged pawls mounted on said driving member and adapted to engage the notches in said driven member, control linkage means normally operated by the said control key and including a longitudinally slidable finger adapted to open and close the said switch, and a latching lever operable to normally retain the said slidable finger in a switch closing position for movement with the said linkage means and to release the said finger for movement to a switch opening position, the said pawls being operable upon the displacement from said notches to release the said latching member to open the said switch independently of the position of the said control linkage.

6. An overload device for a business machine having an electric motor and a normally open power switch for said motor, a drive shaft connected to said motor, a driven shaft associated with said drive shaft, notches in one of said shafts, spring-urged pawls mounted on the other of said shafts normally engaging the notches of the said one shaft, linkage means including a live tip slidably supported thereon for controlling operation of the said switch, a latch normally latching the live tip operatively to said linkage means, and means actuated by the outwardly displaced pawls for automatically releasing the said latch, whereby the switch is permitted to move to its normally open position independently of the control exercised thereon by the said linkage means.

7. In a device of the character described, a motor, a driving member connected to said motor, a driven member associated with said driving member, notches in one of said members, a pawl mounted on the other of said members, resilient biasing means urging said pawl into engagement with the notch of the said one member, a switch controlling the flow of power to said motor, and means controlled by the displacement of said pawl from said notch for opening said switch.

8. In a device of the character described, a motor, a switch controlling the flow of power to said motor, a driving member connected to said motor, a driven member associated with said driving member, and a yieldable connection between said driving and driven members comprising a notch in said driven member, a pawl mounted on said driving member and adapted to engage the notched driven member, a spring urging said pawl into engagement with said notch, and means operated by movement of said pawl out of said notch for opening said switch.

9. An overload mechanism for a business machine driven by an electric motor and having a normally open power supply switch for controlling operation of the motor which comprises a power input shaft for the said machine, a slip clutch member between the said motor and the said input shaft having a plurality of normally retracted cams thereon adapted to be positively expanded in response to a predetermined overload condition, linkage means including a retractable live link member for operating the said switch, latch means for normally latching the said live link member in a first adjusted position relative to the said linkage means and for releasing the said live link member for movement to a second adjusted position upon displacement of said cams from their retracted position to move to the open circuit position, and manually operable means for resetting the said live link member in its first adjusted position independently of said linkage means.

JOHN L. MOODY.
ELWOOD A. DAVIS.

References Cited in the file of this patent
UNITED STATES PATENTS

| Number | Name | Date |
| --- | --- | --- |
| 1,996,312 | Tremolada | Apr. 2, 1935 |
| 2,004,282 | Horton | June 11, 1935 |
| 2,062,905 | Hilty et al. | Dec. 1, 1936 |
| 2,203,233 | Panish | June 4, 1940 |
| 2,536,319 | Slack | Jan. 2, 1951 |